United States Patent [19]

Wiemer et al.

[11] 4,062,661
[45] Dec. 13, 1977

[54] DIFFUSER FOR FINELY DIVIDING A LIQUID, PARTICULARLY WATER TO BE DEGASSED

[75] Inventors: Willem Wiemer, Delden; Mart van den Boomen, Hengelo, both of Netherlands

[73] Assignee: Koninklijke Machinefabriek Stork B.V., Hengelo, Netherlands

[21] Appl. No.: 688,318

[22] Filed: May 20, 1976

[30] Foreign Application Priority Data

June 6, 1975 Netherlands .................... 7506770

[51] Int. Cl.² ........................................... B01D 19/00
[52] U.S. Cl. ...................................... 55/190; 55/201; 55/408; 239/602
[58] Field of Search ............... 55/52, 55, 158, 183, 55/185, 186, 190, 194, 199, 201, 202, 408; 239/534, 535, 602

[56] References Cited

U.S. PATENT DOCUMENTS

| 301,228 | 7/1884 | Gillespie | 239/534 X |
| 1,895,983 | 1/1933 | Emanueli | 55/194 |
| 2,797,767 | 7/1957 | Brooke et al. | 55/194 X |
| 3,407,569 | 10/1968 | Hendricks | 55/52 |
| 3,486,314 | 12/1969 | Herrington | 55/408 |

FOREIGN PATENT DOCUMENTS

| 189,486 | 5/1964 | Sweden | 55/201 |
| 525,555 | 8/1940 | United Kingdom | 239/534 |

*Primary Examiner*—Frank A. Spear, Jr.
*Assistant Examiner*—Robert H. Spitzer
*Attorney, Agent, or Firm*—Snyder, Brown & Ramik

[57] ABSTRACT

A diffuser for finely dividing a liquid, particularly water to be degassed, in which at least two annular plates pairwise engage one another by rims located near the outer circumference and are held spaced apart at the inner circumference by spacers having a radial passage, the space inside the plates of each pair having a connection for the supply of the pressurized liquid to be diffused, at least one of each pair of relatively co-operating plates being resilient and means being provided for clamping the plates together against spring force.

16 Claims, 13 Drawing Figures

U.S. Patent  Dec. 13, 1977  Sheet 1 of 2  4,062,661
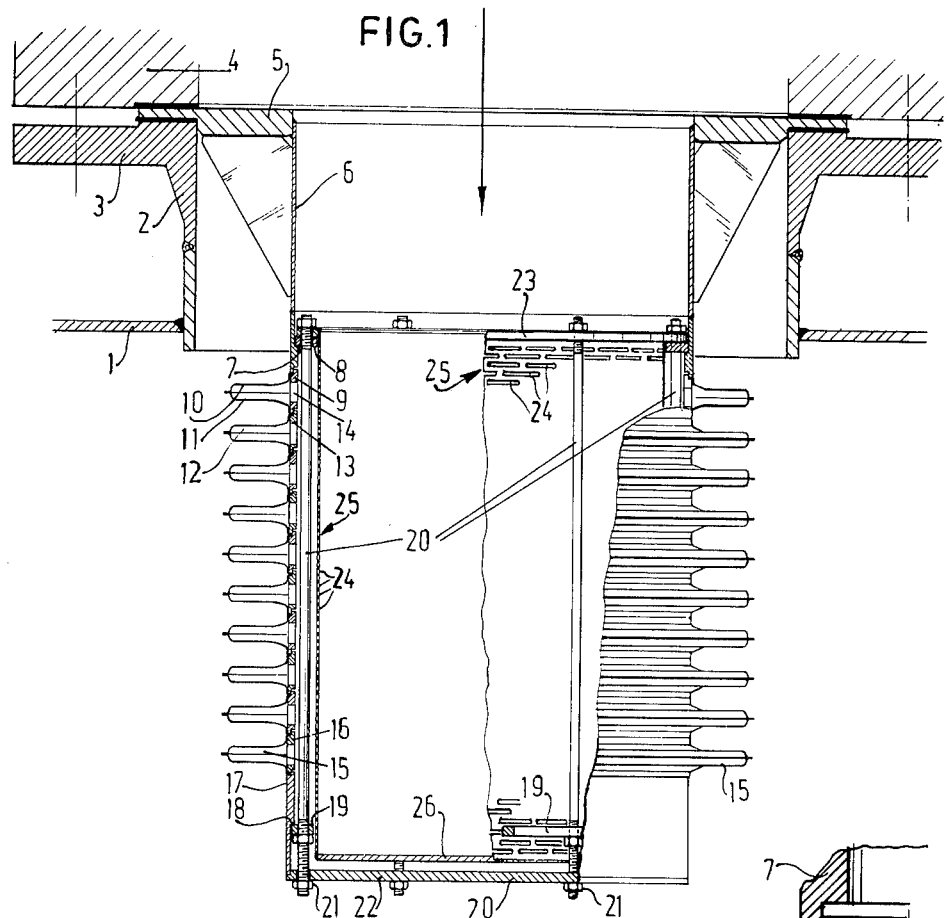
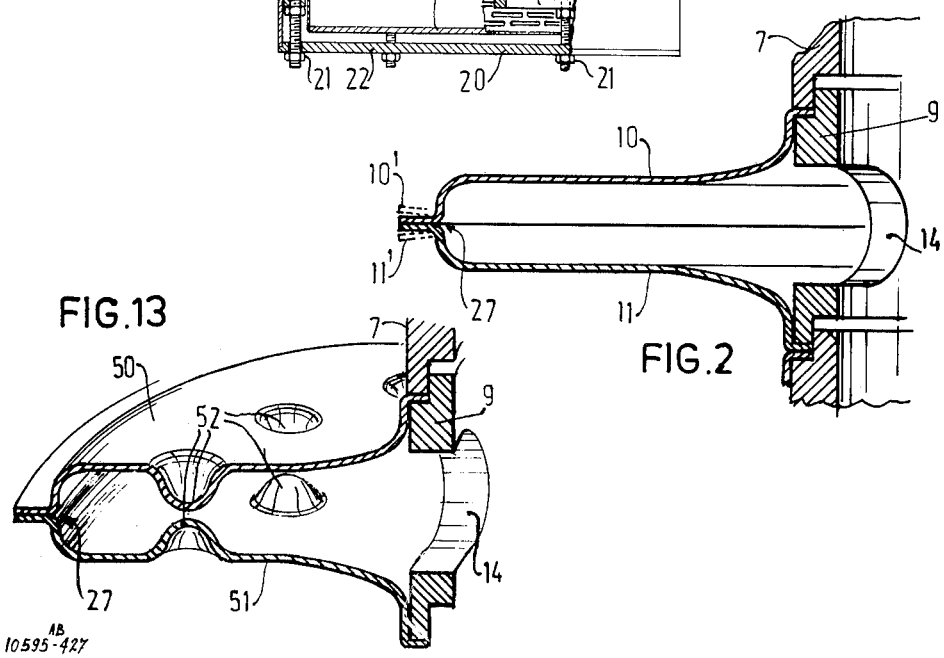

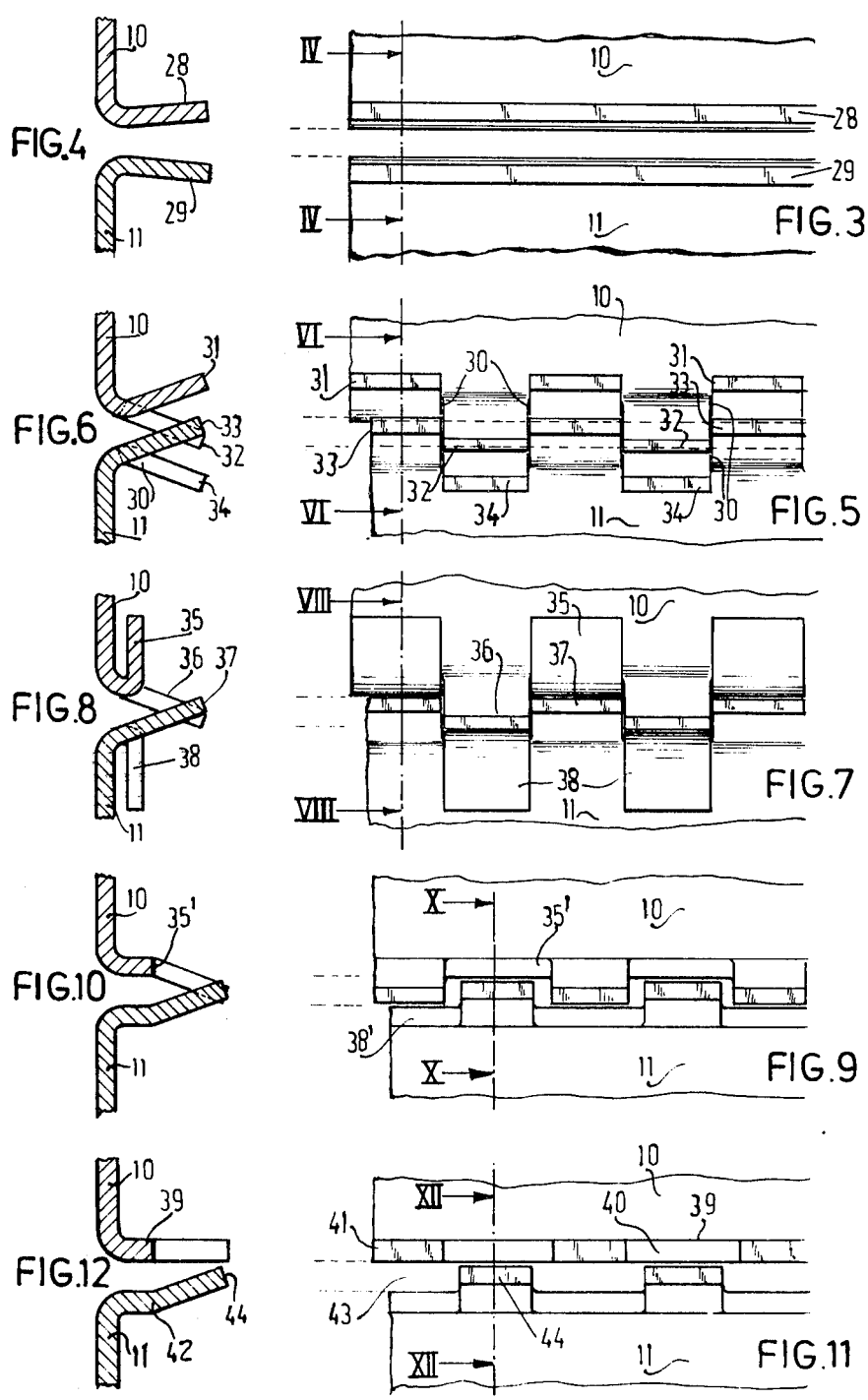

DIFFUSER FOR FINELY DIVIDING A LIQUID, PARTICULARLY WATER TO BE DEGASSED

The invention relates to a diffuser for finely dividing a liquid particularly water to be degassed. In such a device the liquid is finely divided in order to obtain a large contact surface. In the case of a degassifier heat exchange takes place between the droplets formed and the surrounding steam, whilst at the same time a given degree of degassification occurs. The quality of the diffusion is very important for a satisfactory operation of the device in which the diffuser is employed and therefore, in the event of variable loads of the diffuser a satisfactory distribution of the liquid should invariably be ensured. The passage of the diffuser should automatically match the supply of liquid so that invariably an adequate drop of pressure will be available across the diffuser opening for finely dividing the liquid.

In a known diffuser for use in a degassifier the adaption of the passage is achieved by causing an apertured cylinder to shift in place in a sleeve intimately surrounding said cylinder. The cylinder is spring-controlled and in dependence upon the quantity of liquid supplied the cylinder shifts out of the sleeve against the spring force so that a number of apertures is set free in accordance with the quantity of liquid supplied.

This known construction has the disadvantage of being sensitive to dirt. The dirt may stick in the apertures and give rise to jamming of the cylinder in the sleeve. In order to be able to load the cylinder by a spring, a stuffing box has to be used, which is disadvantageous. Moreover the forces produced in the connecting ducts may result in a deformation of the sleeve surrounding the cylinder, which may result in jamming.

The invention has for its object to provide a diffuser capable of automatically adapting the available distributing passage to the available quantity of liquid, a satisfactory division of the liquid being always ensured and the aforesaid disadvantages being eliminated.

According to the invention at least two annular plates are pairwise bearing one on the other by rims located near the outer circumference, said plates being held spaced apart at the inner circumference by means of spacers having a radial passage, the space inside the plates of each pair having a connection for the supply of the pressurized liquid to be divided, at least one of each pair of relatively cooperating plates being resilient and means being provided for clamping together the plates against the spring force. With such a diffuser an increase in pressure in the space inside the plates will result in bending of the plates against the spring force so that gap-like openings will be formed neat the outer rims of the plates. The greater is the increase in pressure, the larger will be the openings between the plates, so that the capacity of the diffuser will increase. Since there are no parts sliding one along the other, jamming will not occur.

In an effective embodiment of the diffuser in accordance with the invention the inner circumferential rims of the dish-shaped plates and of the intermediate rings are pressed against one another by means of two end rings and of a set of pull rods evenly distributed along the circumference and interconnecting said end rings. In this way the diffuser can be constructed in a simple manner.

According to the invention a perforated sleeve may be arranged between the dish-shaped plates and the rings to serve as a flow-divider for the liquid. The flow-divider or flow-setter may furthermore have in known manner a space for collecting unpassed dirt near the lower end.

According to the invention the dish-shaped plates may have outwardly extending flanges at the outer circumference beyond the rims by which they engage one another pairwise. These flanges impart a given direction to the emerging liquid.

According to the invention the flanges may diverge in a diffuser-like manner. Thus the dividing action on the outflow of liquid is improved.

In accordance with the invention the flanges of each pair of relatively co-operating dishes may be incised in a radial direction and the tags thus formed on each flange may be alternately bent over downwardly and upwardly, the tags of one flange being each time located between the tags of the other flange on either side of the former. These tags tear up the liquid screens formed.

According to the invention every other tag of the flange may be bent out of the path of the liquid stream. Under certain conditions this may have a favourable effect on the dividing action.

According to the invention every other tag of each flange may be cut off. This results in the same effect as in the former case.

According to the invention the flanges of each pair of relatively co-operating dishshaped plates may have recesses with intermediate tags, the tags of one flange being bent over towards the recess of the other flange. Consequently, the tags of the other flange are not bent out of the plane of the flange.

In the case of a diffuser having a vertical centre line and comprising a plurality of pairs of dish-shaped plates the lower flange of the upper pair and the upper flange of the lower pair may extend horizontally. The overall quantity of diffused liquid then has a disc-shaped section.

Finally, one or more pairs of dish-shaped plates may have a spring constant or be subjected to a bias stress differing from that of the other pairs. Under given conditions the adaption to the load may be improved. At a low pressure, for example, only a few gaps open, whereas at an increase in pressure more gaps will open so that even with very different loads a satisfactory diffusion effect is obtained.

The invention will be described more fully hereinafter with reference to an embodiment shown in the drawing. In the drawing:

FIG. 1 is a schematic sectional view of a diffuser in accordance with the invention, FIG. 2 shows on an enlarged scale a detail of FIG. 1, FIG. 3 shows a detail of the outlet rim for the liquid on an enlarged scale in an elevational view of a first embodiment, FIG. 4 is a sectional view taken on the line IV—IV in FIG. 3, FIG. 5 is an elevational view of a further embodiment of the outlet rim for the liquid, FIG. 6 is a sectional view taken on the line VI—VI in FIG. 5, FIG. 7 is an elevational view of again a further embodiment of the outlet rim, FIG. 8 is a sectional view taken on the line VIII—VIII in FIG. 7, FIG. 9 is an elevational view of a further embodiment of the outlet rim, FIG. 10 is a sectional view taken on the line X—X in FIG. 9, FIG. 11 is an elevational view of a final embodiment of the outlet rim for the liquid, FIG. 12 is a sectional view taken on the line XII—XII in FIG. 11, FIG. 13 shows a further embodiment of a detail corresponding with that shown in FIG. 2.

The diffuser shown in FIG. 1 forms part of a device for degassing water. A vessel 1 is provided with a stud 2 having a flange 3. A feeding duct 4 for the water to be degassed is connected with the stud 2. A flange 5 having a sleeve-like part 6 is fastened to the flange 3. The sleeve-like part 6 has a shoulder 7 holding a ring 8. The lower end of the sleeve 6 is joined by a fitting ring 9, a plate 10 in the form of a cup spring being clamped between the ring 9 and the lower edge of the sleeve 7. A second plate 11 is adapted to co-operate with the plate 10. The plate 11 is clamped by the inner circumferential edge against a next plate 12 between the lower edge of the ring 9 and a further ring 13, which is again provided with a fitting rim. FIG. 2 shows the plates 10 and 11 on an enlarged scale. The ring 9 has an opening 14 for admitting the liquid fed from the top side of the sleeve 6 into the space between the plates 10 and 11. Like the plates 10 and 11 a plurality of plate pairs are combined and locked each time between to adjoining rings constructed in the same manner as the ring 9. The lowermost plate 15 is clamped between the lowermost ring 16 and an annular part 17. The annular part 17 has a shoulder 18 holding a ring 19. The rings 19 and 18 are drawn towards one another by a plurality of pulling rods 20 evenly distributed along the circumference. By means of the pulling rods and an additional nut 21 a plate 22 is furthermore fastened as a cover to the lower end of the sleeve-like part 17. The ring 8 supports a further ring 23 holding an apertured sleeve 25. The sleeve 25 is closed at the bottom end by a plate 26 and constitutes a flow-setter for the water which is fed from the top side through the opening 14 to the space inside the pairs of plates, as is the case for the plates 10 and 11. When the liquid is supplied, for example, through the opening 14 between the plates 10 and 11, the increase in pressure at 27 will result in a gap-like opening indicated by broken lines. The rims then occupy the positions 10' and 11' respectively so that the water is ejected in the form of a horizontal screen. The greater is the quantity of liquid supplied and the higher becomes the available pressure drop, the wider becomes the gap between the outer circumferential edges of the plates 10 and 11. Thus the width of the outlet gap automatically matches the quantity of liquid supplied.

The dish-shaped plates 10 and 11 may both be resilient, but as an alternative only one of the plates may be resilient, whereas the other plate is rigid. As a further alternative a number of pairs of relatively co-operating plates may have different spring constants or be subjected to different bias stresses so that with the supply of a given quantity of liquid not all pairs of plates become simultaneously operative. This results in a larger controlrange of the diffuser.

FIGS. 3 to 12 illustrate the various embodiments of the outer rims of the plates in a position in which liquid is fed to the diffuser. This position corresponds with that indicated in FIG. 2 by a broken line.

FIGS. 3 and 4 show that the dish-shaped plates have outwardly extending flanges 28 and 29 at the outer circumference. The flanges of FIG. 4 extend in diffuser-like fashion, which contributes to a rapid division of the resultant water screen into droplets. The plates are again designated for the sake of clearness by 10 and 11. FIG. 6 shows a plate 10' provided with a flange having tags 31 and 32 owing to the incisions 30, said tags being alternately bent over upwardly and downwardly. The plate 10 has corresponding incisions and tags 33 and 34. The tag 33 is located between the tags 32 of the plate 10'.

FIGS. 7 and 8 show corresponding tags at the plates 10 and 11, but every other tag is bent out of the stream of liquid. The tag 35, for example, is completely bent back, though the tag 36 of the plate 10 and the tag 37 of the plate 11 remain operative. The tag 38 of the plate 11 is again bent back.

FIGS. 9 and 10 show an embodiment similar to that of FIGS. 7 and 8, but the tags 35 and 38 are cut through as is indicated by 35' and 38'. The effect obtained is the same as in the embodiments shown in the preceding figures. FIGS. 11 and 12 show plates 10 having a horizontal flange 39 having recesses 40 forming tags 41. The tags are not bent out of the plane of the flange 39. The plate 11 also has a flange 42 having recesses 43, between which tags 44 are formed. The tags 44 are bent out of the plane of the flange 42 towards the flange 39, the tags 44 each time located at the level of the recesses 40 in the other flange.

All embodiments shown in FIGS. 5 to 12 provide an additional effect on the liquid emerging from between the plates 10 and 11. The tags tear up the resultant water screen, which results in a more rapid and effective diffusion of the water.

FIG. 13 shows an embodiment in which the plate 50 and 51 are provided with opposite depressions 52. If the plates are abruptly subjected to a heavy, external excess pressure, the depressions 52 come into contact with one another, which prevents colapsing of the plates.

What we claim is:

1. In a diffuser for finely dividing a liquid, particularly water to be degassed, the combination of:
an assembly defining a chamber and having an inlet for receiving liquid under pressure, said assembly including at least two plates having mutually opposed peripheral portions, means for fixing said plates relative to each other, and at least one of said plates being resilient so that pressure of fluid therebetween is effective to deform said one plate and effect a pressure-regulated separation between said peripheral portions; said means comprising clamping means for resiliently clamping the peripheral portion of said one plate against the peripheral portion of the other plate.

2. In a diffuser as defined in claim 1 wherein said peripheral portions are in the form of annular flanges.

3. In a diffuser as defined in claim 2 wherein said flanges diverge in diffuser-like fashion.

4. In a diffuser for finely dividing a liquid, particularly water to be degassed, the combination of:
an assembly defining a chamber and having an inlet for receiving liquid under pressure, said assembly including at least two plates having mutually opposed peripheral portions, means for fixing said plates relative to each other, and at least one of said plates being resilient so that pressure of fluid therebetween is effective to deform said one plate and effect a pressure-regulated separation between said peripheral portion;

said assembly also includes a spacer between said plates and said means for fixing clamps said plates against said spacer whereby the peripheral portion of said one plate is resiliently clamped against the other plate.

5. In a diffuser as defined in claim 4 wherein said peripheral portions are in the form of annular flanges.

6. In a diffuser as defined in claim 5 wherein said flanges diverge in diffuser-like fashion.

7. In a diffuser as defined in claim 5 wherein said flanges are radially notched to define circumferentially spaced tags in which the tags of one plate are interdigitated with the tags of the other plate.

8. In a diffuser as defined in claim 7 wherein adjacent tags of the two plates extend in divergent relation.

9. In a diffuser as defined in claim 8 wherein each notch is defined by a folded tab.

10. In a diffuser for finely dividing a liquid, particularly water to be degassed, the combination of:

an assembly defining a chamber and having an inlet for receiving liquid under pressure, said assembly including at least two plates having mutually opposed peripheral portions, means for fixing said plates relative to each other, and at least one of said plates being resilient so that pressure of fluid therebetween is effective to deform said one plate and effect a pressure-regulated separation between said peripheral portion;

said peripheral portions being in the form of annular flanges and said flanges being radially notched to define circumferentially spaced tags in which the tags of one plate are interdigitated with the tags of the other plate.

11. In a diffuser as defined in claim 10 wherein adjacent tags of the two plates extend in divergent relation.

12. In a diffuser for finely dividing a liquid, particularly water to be degassed, the combination of:

an assembly defining a normally closed chamber and having an inlet for receiving liquid under pressure, said assembly including at least two plates and a spacer sandwiched between said plates, said spacer being of annular configuration and said plates being of generally circular profile with a diameter greater than the diameter of said spacer, said plates and said spacer being concentrically disposed, at least one of said plates being resilient and of dish shape to present a generally flat annular portion extending radially outwardly from said spacer and an outer marginal rim which extends toward and into contact with the other plate to define a circumferentially extending discharge mouth therewith, and clamping means clamping said plates tightly against said spacer;

said spacer being of a thickness which causes said generally flat annular portion of one plate to be deformed under the action of said clamping means normally to close said circumferentially extending discharge mouth.

13. In a diffuser as defined in claim 12 wherein each plate is resilient and dish shaped whereby the two plates define a mutually opposed pair.

14. In a diffuser as defined in claim 13 wherein said assembly comprises a plurality of said mutually opposed pairs of plates and an intervening spacer for each pair, all disposed in a stack.

15. In a diffuser as defined in claim 14 wherein certain of said pairs of plates contact each other with different clamping forces.

16. In a diffuser as defined in claim 15 wherein certain of said plates have different spring constants.

* * * * *